Nov. 15, 1955 E. J. KOWALSKY 2,723,887
TABLE STRUCTURE FOR VEHICLE BODIES
SWINGABLE TO EXTENDED POSITION
Filed May 10, 1954 2 Sheets-Sheet 1
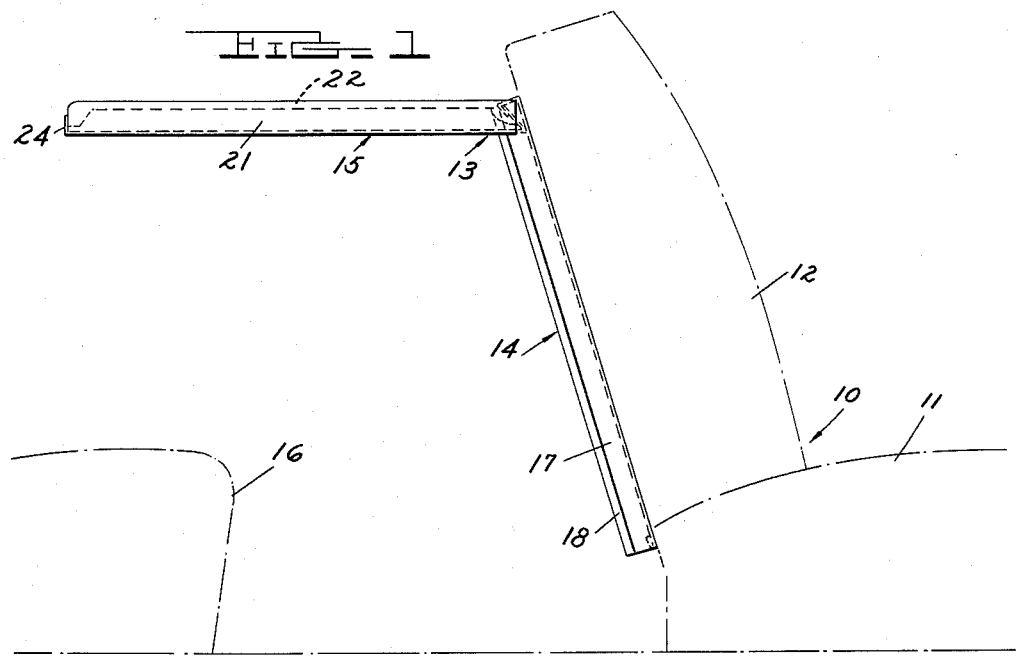
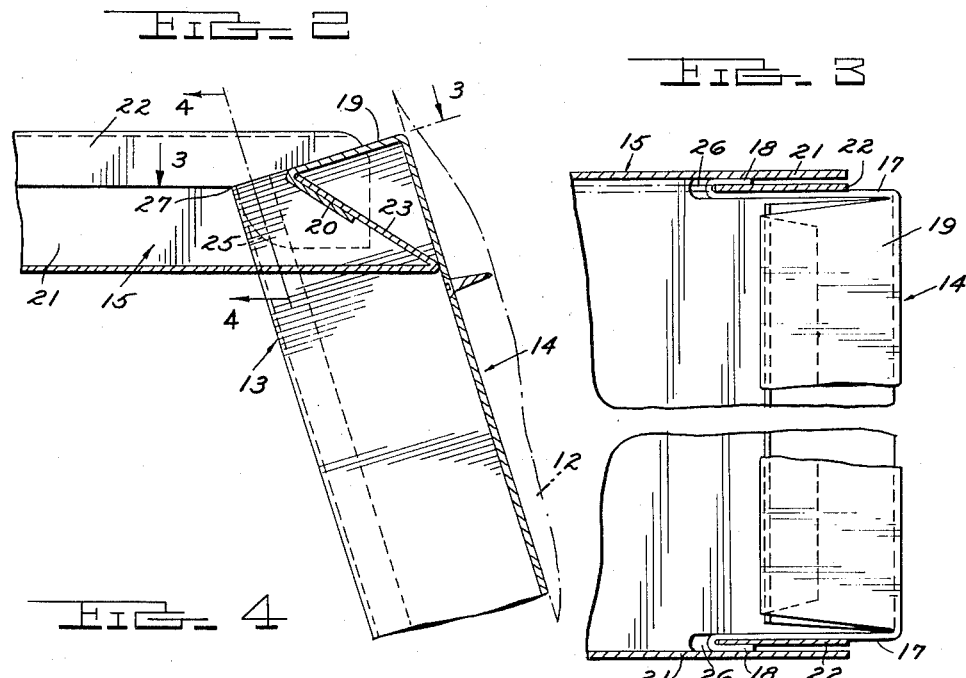
INVENTOR.
EDWARD J. KOWALSKY
BY
*Whittemore, Hulbert & Belknap*
ATTORNEYS

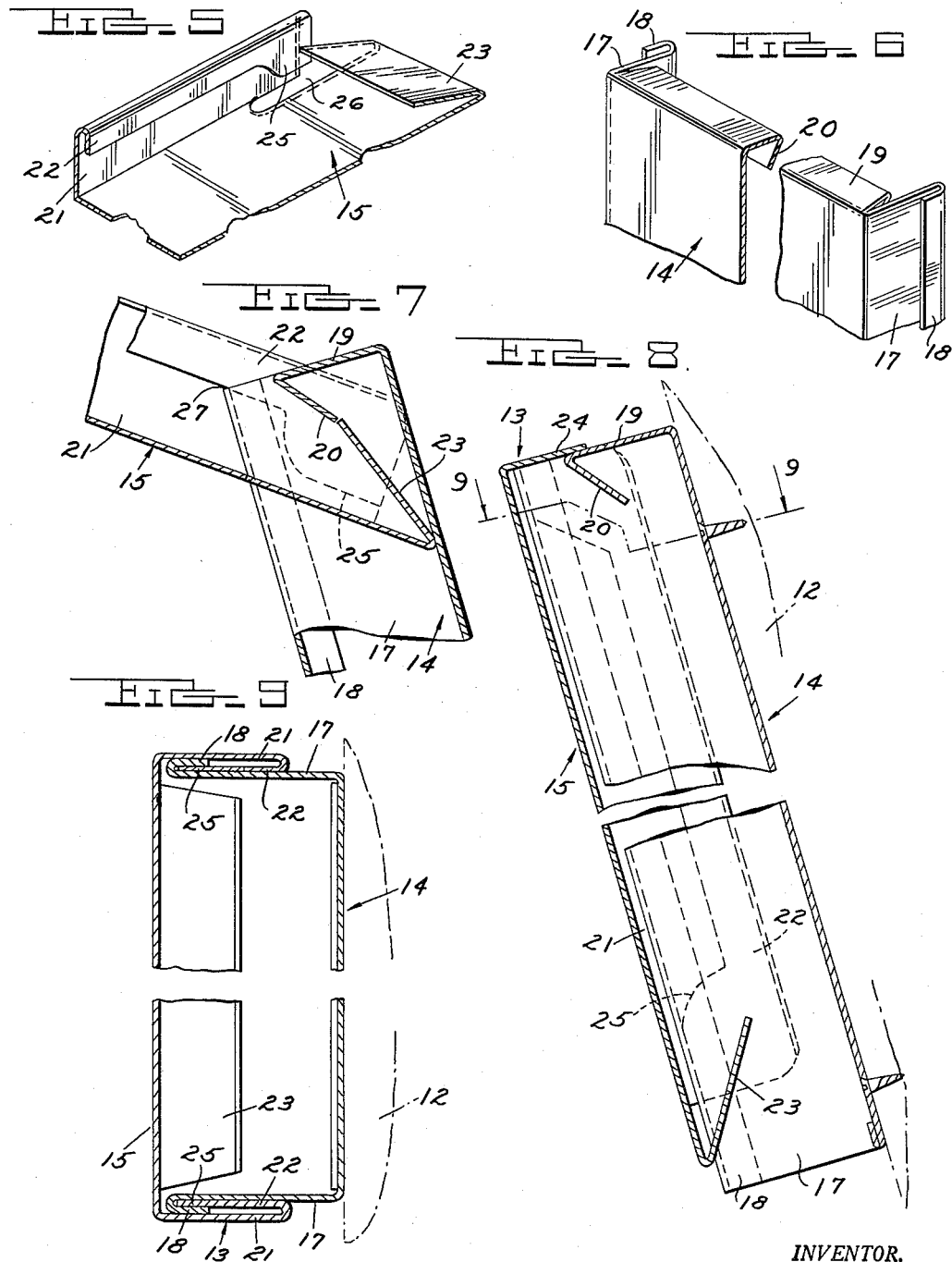

United States Patent Office 2,723,887
Patented Nov. 15, 1955

2,723,887

TABLE STRUCTURE FOR VEHICLE BODIES SWINGABLE TO EXTENDED POSITION

Edward J. Kowalsky, Oxford, Mich.

Application May 10, 1954, Serial No. 428,701

8 Claims. (Cl. 311—21)

This invention relates to an improved collapsible table structure for installation in passenger vehicles.

It is an object of this invention to provide a collapsible table structure capable of either being built in or readily installed on the back of a vehicle body seat assembly, and composed of a minimum number of parts designed to enable manufacture of the table on a high volume production basis at a reasonable cost.

It is another object of this invention to provide a collapsible table structure composed of two sheet metal parts, one of the parts being attachable to the back of a vehicle body seat and the other of the parts being movable from a folded position in overlying relationship to the fixed part to an extended position wherein it projects outwardly from the fixed part to provide a supporting surface in convenient relationship to the occupant of the next adjacent seat in the vehicle body.

It is a further object of this invention to provide a collapsible seat structure of the foregoing type wherein the two parts form a compact assembly when folded and do not project to any appreciable extent into the clearance space provided in the vehicle body between the seats.

The foregoing as well as other objects will be made more apparent as this description proceeds especially when considered in connection with the accompanying drawings, wherein:

Figure 1 is a diagrammatic elevational view of a collapsible table structure embodying the features of this invention and showing the same installed on the back of a vehicle body seat;

Figure 2 is an enlarged sectional view of a part of the collapsible table structure;

Figure 3 is a sectional view taken on the line 3—3 of Figure 2;

Figure 4 is a sectional view taken on the line 4—4 of Figure 2;

Figure 5 is a fragmentary perspective view of one part of the table structure;

Figure 6 is a fragmentary perspective view of the other part of the collapsible table structure;

Figure 7 is an enlarged fragmentary sectional view of the collapsible table structure showing the parts in one relative position;

Figure 8 is a longitudinal sectional view through the collapsible table structure and showing the parts in their collapsed position; and Figure 9 is a cross sectional view taken on the line 9—9 of Figure 8.

In Figure 1 of the drawings, the numeral 10 indicates a conventional vehicle body seat assembly comprising a cushion 11 and a back section 12. Attached to the rear side of the seat back 12 is a collapsible table structure 13 embodying the features of this invention.

The table structure 13 comprises a fixed part in the form of a plate 14, and a movable part in the form of a plate 15. Both plates may be and preferably are formed of sheet metal. The plate 14 may be screwed or otherwise secured to the rear side of the vehicle body seat 12 and extends in an upright direction along the rear side of the seat 12 to a position adjacent the top of the latter in the manner illustrated in Figure 1 of the drawings. As will be presently described, the plate 15 is slidably and pivotally mounted on the plate 14 to provide an assembly with the latter. In the collapsed position of the two plates shown in Figure 8 of the drawings, the plate 15 overlies the plate 14 at the rear side of the latter to provide a compact unit which does not interfere to any appreciable extent with the clearance provided between the rear side of the seat back 12 and the front edge of the next adjacent seat indicated in Figure 1 by the reference character 16. It will be apparent from the following description that the plate 15 is movable upwardly relative to the fixed plate 14 and is capable of being swung rearwardly in its uppermost position to provide an article supporting tray in convenient relationship with the seat 16.

In detail, the plate 14 is fashioned with flanges 17 which project rearwardly from the opposite vertical edges of the plate and which are return bent at the rear edges to provide forwardly extending flanges 18. The flanges 18 are spaced laterally outwardly from the flanges 17 to form vertically extending guides at opposite sides of the plate 14. The top edge of the plate 14 is turned rearwardly to provide a flange 19 and the rear edge of the flange 19 is turned downwardly and forwardly to provide a lip 20.

The plate 15 is fashioned with flanges 21 which extend forwardly from the opposite vertical edges and which are return bent in an inward direction to provide rearwardly extending flanges 22. The bottom edge of the plate 15 between the flanges 22 is turned upwardly to provide a forwardly inclined lip 23 and the top edge of the plate 15 is turned in a forward direction to provide a flange 24. As shown in Figure 5 of the drawings, the flanges 21 and 22 terminate short of the bottom edge of the plate 15, and the width of the flanges 22 at the lower ends thereof is increased to form abutments 25. It will also be noted from Figure 5 of the drawings that the lower end of the plate 15 is slotted or cut away at opposite side edges to form clearance openings 26. The purpose of the abutments 25 and clearance openings 26 will become apparent as this description proceeds.

When the two plates are assembled as shown in Figures 8 and 9 of the drawings, the flanges 22 at opposite side edges of the plate 15 overlie the flanges 17 at opposite side edges of the plate 14 in sliding engagement with the latter flanges, and the abutments 25 at the lower ends of the flanges 22 project into the guides formed by the flanges 18 and 17. The lip 23 is of a length to project freely between the flanges 17 on the part 14 so as not to interfere with upward sliding movement of the part 15 relative to the fixed part 14. As shown in Figure 8 of the drawings, the flange 24 at the top of the plate 15 overlies the flange 19 in the collapsed position of the parts to limit the extent of downward movement of the part 15 relative to the part 14.

The part 15 is movable upwardly relative to the part 14 until the lip 23 at the bottom of the part 15 overlies the front side of the lip 20 at the top of the part 14. After the part 15 reaches the limit of its upward movement relative to the part 14, the part 15 may be swung rearwardly to the horizontal position thereof shown in Figures 1 and 2 of the drawings. The rearward swinging movement of the part 15 is rendered possible by reason of the clearance openings 26 which are of sufficient width to freely receive the flanges 18 and 17 on the fixed plate 14. It will also be noted from Figures 2 and 4 of the drawings that during rearward swinging movement of the plate 15, the edges of the flanges 22 immediately adjacent the abutments 25 engage the upper ends of the return bent portions on the flanges 17 with the result that the upper ends of the return bent portions act as fulcrums for the part 15. The fulcrum points are indicated in Figures 2 and 4 of the drawings by the numeral 27. Furthermore, the upper ends of the return bent portions at the rear edges of the flanges 17 serve as a support for the plate 15 when the latter is in its horizontal position. An additional support is provided by engagement of the lip 23 with the lip 20 (Fig. 2) when the plate 15 is in its extended or horizontal position shown in Figures 1 and 2 of the drawings.

With the above construction, it will be apparent that when it is desired to move the plate 15 from its extended or horizontal position shown in Figure 2 to its collapsed position shown in Figure 8, the plate is merely swung upwardly about the fulcrum points 27 until it is in vertical alignment with the fixed plate 14. As the plate 15 is swung upwardly, it also slides in a downward direction relative to the fixed part 14 (Fig. 7) to release the lip 23 from the lip 20 and thereby permit sliding of the plate 15 to its collapsed position relative to the plate 14, shown in Figure 8 of the drawings.

What I claim as my invention is:

1. A collapsible table structure comprising a first plate attachable to a seat back in an upright position, flanges projecting rearwardly from opposite side edges of the first plate and return bent at the rear edges to provide forwardly opening guides, a second plate in overlying relationship to the rear side of the first plate and slidable relative to the first plate in an up and down direction, flanges projecting forwardly from opposite side edges of the second plate in overlying relationship to the outer sides of the flanges on the first plate and return bent to provide portions which project into the guides, a stop at the top of the first plate, and a lip at the bottom of the second plate engageable with the stop upon movement of the second plate to its uppermost position relative to the first plate.

2. A collapsible table structure comprising a first plate attachable to a seat back in an upright position, flanges projecting rearwardly from opposite side edges of the first plate and return bent at the rear edges to provide forwardly opening guides, a second plate in overlying relationship to the rear side of the first plate and slidable relative to the first plate in an up and down direction, flanges projecting forwardly from opposite side edges of the second plate in overlying relationship to the outer sides of the flanges on the first plate and return bent at the lower ends to provide abutments which project into the guides for slidably supporting the second plate on the first plate, a stop at the top of the first plate, a lip at the bottom of the second plate engageable with the stop to limit upward movement of the second plate, and the upper ends of the guides providing fulcrums engageable with the second plate at the rear edges of the abutments to permit rearward swinging movement of the second plate to an extended position relative to the first plate.

3. The structure defined in claim 2 wherein the second plate is slotted to provide clearance openings for the flanges on the first plate upon rearward swinging movement of the second plate relative to the first plate.

4. The structure defined in claim 2 wherein the stop is in the form of a flange projecting rearwardly from the top edge of the first plate and having a depending lip positioned to engage the underside of the lip on the second plate to support the second plate in said extended position.

5. The structure defined in claim 4 wherein the abutments have arcuate edges arranged to have a rolling engagement with the guides during swinging movement of the second plate relative to the first plate.

6. A collapsible table structure comprising a first plate attachable to a seat back in an upright position, flanges projecting rearwardly from opposite side edges of the first plate and return bent at the rear edges to provide forwardly opening guides, a second plate in overlying relationship to the rear side of the first plate and slidable relative to the first plate in an up and down direction, flanges projecting forwardly from opposite side edges of the second plate in overlying relationship to the outer sides of the flanges on the first plate and return bent at the lower ends to provide abutments which project into the guides for slidably supporting the second plate on the first plate, the upper ends of the guides providing fulcrums engageable with the second plate at the rear edges of the abutments to permit rearward swinging movement of the second plate to an extended position relative to the first plate, and cooperating engagement means on said plates for preventing rearward swinging movement of said second plate beyond said extended position.

7. A collapsible table structure comprising a first plate attachable to a seat back in an upright position, flanges projecting rearwardly from opposite side edges of the first plate and return bent at the rear edges to provide forwardly opening guides, a second plate in overlying relationship to the rear side of the first plate and slidable relative to the first plate in an up and down direction, flanges projecting forwardly from opposite side edges of the second plate in overlying relationship to the outer sides of the flanges on the first plate and return bent at the lower ends to provide abutments which project into the guides for slidably supporting the second plate on the first plate, the upper ends of the guides providing fulcrums engageable with the second plate at the rear edges of the abutments to permit rearward swinging movement of the second plate to an extended position relative to the first plate, and means for supporting said second plate in said extended position.

8. A collapsible table structure comprising a first plate attachable to a seat back in an upright position, flanges projecting rearwardly from opposite side edges of said first plate, said flanges having means thereon providing forwardly opening guides, a second plate in overlying relationship to the rear side of said first plate and slidable relative to said first plate in an up and down direction, flanges projecting forwardly from opposite side edges of said second plate in overlying relationship to the outer sides of the flanges on said first plate, means on the flanges on said second plate providing abutments which project into the guides for slidably supporting the second plate on the first plate, the upper ends of the guides providing fulcrums engageable with the second plate at the rear edges of the abutments to permit rearward swinging movement of the second plate to an extended position relative to the first plate, and means for supporting said second plate in said extended position.

References Cited in the file of this patent

UNITED STATES PATENTS

| | | |
|---|---|---|
| 7,789 | Shoenberger | Feb. 19, 1850 |
| 881,511 | Waters | Mar. 10, 1908 |
| 978,730 | Gaut | Dec. 13, 1910 |
| 2,184,047 | King | Dec. 19, 1939 |
| 2,469,657 | Linda et al. | May 10, 1949 |
| 2,585,742 | Condon | Feb. 12, 1952 |